United States Patent
Zhao

(10) Patent No.: US 8,489,099 B2
(45) Date of Patent: Jul. 16, 2013

(54) USER EQUIPMENT AND ACCESS METHOD THEREOF

(75) Inventor: Hongxia Zhao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/296,235

(22) Filed: Nov. 15, 2011

(65) Prior Publication Data

US 2012/0058763 A1 Mar. 8, 2012

Related U.S. Application Data

(63) Continuation of application No. PCT/CN2009/071935, filed on Mar. 22, 2009.

(51) Int. Cl.
*H04W 36/32* (2009.01)

(52) U.S. Cl.
USPC ........ 455/441; 455/434; 455/435.1; 455/436; 455/525; 455/11.1

(58) Field of Classification Search
USPC ...................... 455/441, 435.2, 437, 442, 443
See application file for complete search history.

(56) References Cited

U.S. PATENT DOCUMENTS

| | | | |
|---|---|---|---|
| 5,678,185 A * | 10/1997 | Chia | ............................. 455/437 |
| 6,842,620 B2 | 1/2005 | Smith et al. | |
| 2006/0268756 A1 | 11/2006 | Wang | |
| 2007/0019587 A1 * | 1/2007 | Okamoto et al. | ............. 370/335 |
| 2007/0133500 A1 | 6/2007 | Rajkotia et al. | |
| 2007/0259690 A1 * | 11/2007 | Julian et al. | ................... 455/557 |
| 2008/0101306 A1 | 5/2008 | Bertrand | |
| 2009/0285182 A1 | 11/2009 | Zou et al. | |

FOREIGN PATENT DOCUMENTS

| | | |
|---|---|---|
| CN | 1271902 A | 11/2000 |
| CN | 1938996 A | 3/2007 |
| CN | 101150840 A | 3/2008 |
| CN | 101253730 A | 8/2008 |
| CN | 101257705 A | 9/2008 |
| CN | 101262269 A | 9/2008 |
| CN | 101421995 A | 4/2009 |
| EP | 1631112 A1 | 3/2006 |
| EP | 2051458 A2 | 4/2009 |

(Continued)

OTHER PUBLICATIONS

International search report for International application No. PCT/CN2009/071935, dated Feb. 25, 2010, total 4 pages.

(Continued)

*Primary Examiner* — Kiet Doan
*Assistant Examiner* — Dung Lam
(74) *Attorney, Agent, or Firm* — Huawei Technologies Co., Ltd.

(57) ABSTRACT

In the field of wireless network communications, in order to solve a problem in the prior art that a user equipment (UE) cannot be handed over in time between a mobile access point (AP) and a fixed access point, a UE and an access method thereof are provided. The method includes the following steps. A relative speed between a UE and each access point is calculated. The access point is selected to establish a communication connection if the relative speed between the UE and the access point is smaller than a threshold speed. Therefore, a beneficial effect that the UE can be handed over in time between the mobile access point and the fixed access point is achieved.

14 Claims, 4 Drawing Sheets

FOREIGN PATENT DOCUMENTS

| | | |
|---|---|---|
| WO | 03015442 A1 | 2/2003 |
| WO | 2007062933 A1 | 6/2007 |
| WO | 2007121414 A2 | 10/2007 |
| WO | 2008027627 A1 | 3/2008 |

OTHER PUBLICATIONS

Written opinion of corresponding PCT Patent Application No. PCT/CN2009/071935, mailed on Feb. 5, 2010, 4 pages total.

European search report of corresponding European Patent Application No. 09844792.3, mailed on Feb. 28, 2012, 7 pages total.

Office action issued in corresponding European application No. 09844792.3, dated Mar. 7, 2013, total 5 pages.

Office action issued in corresponding Chinese application No. 200980157126.7, dated Feb. 27, 2013, and an English translation thereof, total 11 pages.

* cited by examiner

USER EQUIPMENT AND ACCESS METHOD THEREOF

CROSS REFERENCE TO RELATED APPLICATIONS

This application is a continuation of International Application No. PCT/CN2009/071935, filed on May 22, 2009, which is incorporated by reference in its entirety.

FIELD OF THE TECHNOLOGY

The present invention relates to the field of wireless network communications, and particularly to a user equipment (UE) and an access method thereof.

BACKGROUND OF THE INVENTION

In a conventional cellular communication system, the coverage of a base station usually varies from 2 km to 5 km. If only the line-of-sight (LOS) transmission is adopted, due to the existence of tall buildings, shadow fading of the channels would be very apparent, and the quality and speed of the signals would be reduced. In the existing technology, an access point, such as a relay station, is installed, establishing between a mobile station and a base station an information channel having a high speed and a small fading, such that the communication quality is greatly improved. A relay station installed on a building or street is called a fixed relay station.

A mobile relay station (MRS) is a relay station installed on a movable carrier, for example, a transportation means (hereinafter referred to as a vehicle). When a user equipment (UE) is on the vehicle, the UE establishes a connection with a ground base station through the MRS, so as to solve the problem of coverage in the vehicle, and reduce the energy consumption of the UE. FIG. 1 is a schematic view of a communication system involving the MRS.

The cellular communication system of the existing technology as described above performs a handover of the UE from a serving cell to a target cell by using a "delay and margin" method.

$$E_{PCCPCH\_Ncell} - E_{PCCPCH\_Serving} > \text{Margin}$$

"$E_{PCCPCH\_Ncell}$" $E_{PCCPCH\_Ncell} - E_{PCCPCH\_Serving}$ in the equation represents a signal intensity of a primary common control physical channel (PCCPCH) of a target cell measured by the UE, "$E_{PCCPCH\_Serving}$" in the equation represents a signal intensity of a PCCPCH of a current serving cell measured by the UE, and Margin in the equation represents a handover margin.

When a time period T, within which the above equation $E_{PCCPCH\_Ncell} > E_{PCCPCH\_Serving} + \text{Margin}$ is satisfied, and T is longer than a threshold value $T_0$ (delay), the UE is handed over from the serving cell to the target cell.

Since the above handover process of the prior art is proposed for the conventional cellular network, it at least has the following problem. When a MRS starts to move from a static state, a relative movement may occur to a group of UEs accessing the MRS, and the UEs need to be handed over in time. However, due to the delay effect, the group of UEs may not be handed over in time.

SUMMARY OF THE INVENTION

The present invention is directed to a UE and an access method of the UE. By using the method, the UE can be timely handed over between a mobile access point and a fixed access point.

In one aspect of the invention, a method is provided. The method includes:
  measuring a relative speed between a UE and each of a plurality of access points; and
  selecting an access point among the plurality of access points, in which the relative speed between the UE and the access point is smaller than or equal to a threshold speed, to establish a communication connection between the UE and the access point.

In another aspect of the invention, a UE is provided. The UE includes a measuring unit and an access interface unit.

The measuring unit is configured to measure a relative speed between the UE and each of a plurality of access points. The access unit is configured to select an access point among the plurality of access points to establish a communication connection between the UE and the access point if the relative speed between the UE and the access point is smaller than or equal to a threshold speed.

Through the embodiments of the present invention, the UE can be handed over in time between a mobile access point and a fixed access point, and the utilization ratio of wireless resources is optimized and frequency of handover is reduced by properly selecting the access point.

BRIEF DESCRIPTION OF THE DRAWINGS

The accompanying drawings are intended for better understanding of the present invention and constitute part of this application rather than limitation of the present invention.

DETAILED DESCRIPTION

For better understanding of the objective, technical solution and merits of the present invention, the following describes the present invention in detail with reference to the accompanying drawings. The exemplary embodiments of the present invention and description thereof are intended for interpreting rather than limiting the scope of the present invention.

Figure 1:
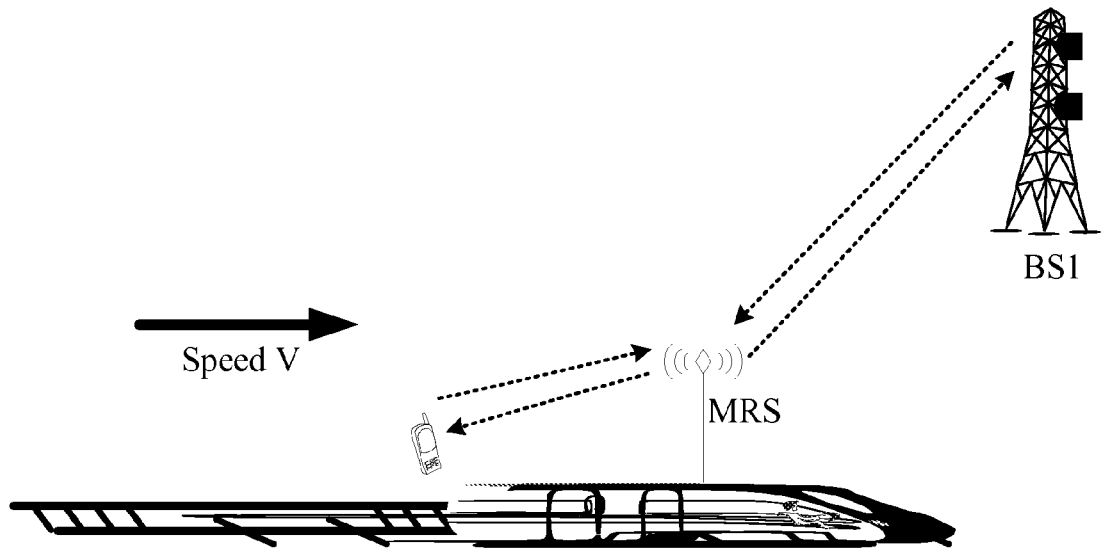
FIG. 1 is a schematic view of a communication system including an MRS in the prior art.
Figure 2:
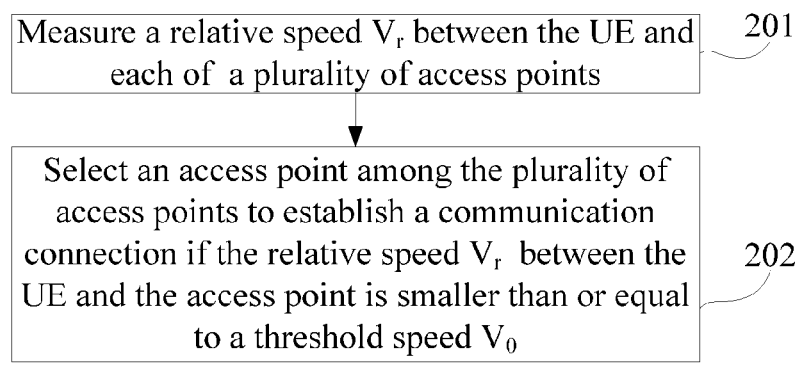
FIG. 2 is a flowchart of a UE access method according to embodiments of the present invention.

FIG. 2 is a flowchart of a UE access method according to embodiments of the present invention.

Step 201, a UE measures a relative speed $V_r$ between the UE and each of a plurality of access points, respectively.

Step 202, the UE selects an access point among the plurality of access points, in which the relative speed $V_r$ between the UE and the access point is smaller than or equal to a threshold speed $V_0$, to establish a communication connection between the UE and the access point.

In an embodiment, before the Step 201, the method may further include: (1) the UE receives broadcast information from each of the plurality of access points, and, from the broadcast information, obtains an indication of whether to perform a handover or an access, and the $V_0$, or (2) the UE adopts a preset indication stored in the UE of whether to perform a handover or an access and the preset $V_0$. Preferably, according to the $V_0$, the UE can be indicated to perform the access or the handover by using the method of the embodiment.

In an embodiment, the broadcast information may be sent by a mobile access point or a fixed access point, or may be sent by both the mobile access point and the fixed access point.

In an embodiment, each access point may acquire the $V_0$ according to an average speed of all the UEs in the each access point's coverage, and the average speed of the UEs may be the walking speed of a user.

In an embodiment, $V_0 = \alpha \overline{V}$, in which $\overline{V}$ is the average speed of the UEs, and usually $1 < \alpha < 2$.

In an embodiment, the UE measuring the relative speed $V_r$ between the UE and each of the plurality of access points may include the UE measuring Doppler frequency shift of signal sent by each of the plurality of access points, and obtaining the $V_r$ according to the Doppler frequency shift.

In an embodiment, the UE may measure the relative speed $V_r$ according to speed information collected by a GPS of the UE and speed information collected by a GPS of each access point.

In an embodiment, the above Step 202 may further include that if the relative speeds $V_r$ between the UE and each one of a plurality of access points is smaller than or equal to the threshold $V_0$, the UE selects the access point having a maximum signal intensity from the plurality of access points to access.

In an embodiment, the above Step 202 may further include that if the relative speeds $V_r$ between the UE and each of the access points are greater than the threshold $V_0$, the UE selects an access point, of which the relative speed $V_r$ between the UE and the access point is the lowest, to establish a communication connection between the UE and the access point.

In an embodiment, the above Step 202 may further include that if the UE and a serving access point are in a connected state, and the $V_r$ between the UE and the serving access point in the connected state is greater than the threshold $V_0$, the UE is handed over from the serving access point in the connected state to a neighboring access point if the relative speed $V_r$ between the UE and the neighboring access point is smaller than or equal to the threshold $V_0$.

In an embodiment, when the UE is handed over from the serving access point to the neighboring access point if the relative speed $V_r$ between the UE and the neighboring access point is smaller than or equal to the threshold $V_0$, the method may further include that if the relative speeds $V_r$ between the UE and each neighboring access point is smaller than or equal to the threshold $V_0$, the UE selects an access point having a maximum signal intensity from the plurality of neighboring access points and is handed over to the access point; and if the relative speeds $V_r$ between the UE and each access point is greater than the threshold $V_0$, the UE is handed over by using a "delay and margin" method, so as to prevent a ping-pong handover.

In an embodiment, the above Step 202 may further include that when the UE selects an access point, in which the relative speed $V_r$ between the UE and the access point is smaller than or equal to the threshold $V_0$, to establish a communication connection between the UE and the access point, if the UE and a serving access point are in a connected state and the $V_r$ between the UE and the serving access point is smaller than or equal to the threshold $V_0$, the UE is handed over by using the "delay and margin" method, so as to prevent a ping-pong handover.

Through the above embodiments, the UE establishes a communication connection with the access point according to the relative speeds between the UE and the access points. When an access point starts moving, a terminal on the ground (i.e. not moving) is handed over from the moving access point in time, and an on-vehicle terminal (i.e. moving with the access point) is handed over to the moving access point in time. It is ensured that the ground terminal does not access the moving access point as much as possible, and during the movement, the moving on-vehicle terminal does not access the ground fixed access point or other neighboring mobile access points as much as possible. In a region with a high user density, for example, on a platform, when a relative move does not occur between the serving access point and the terminal, it is ensured that a ping-pong handover of the user terminal is avoided. In the embodiments of the present invention, base stations and relay stations are both called access points. A mobile access point is usually located on a mobile transportation means, for example, a high-speed train, and a fixed access point is usually located on a static transportation means or a fixed building. In the embodiments of the present invention, the access points having the received signal intensity satisfying the UE access requirement are called the accessible access points (hereinafter "access point" or "access points"), the access points serving the UE are called the serving access points, and the remaining access points except for the serving access points are the neighboring access points of the UE.

Figure 3:
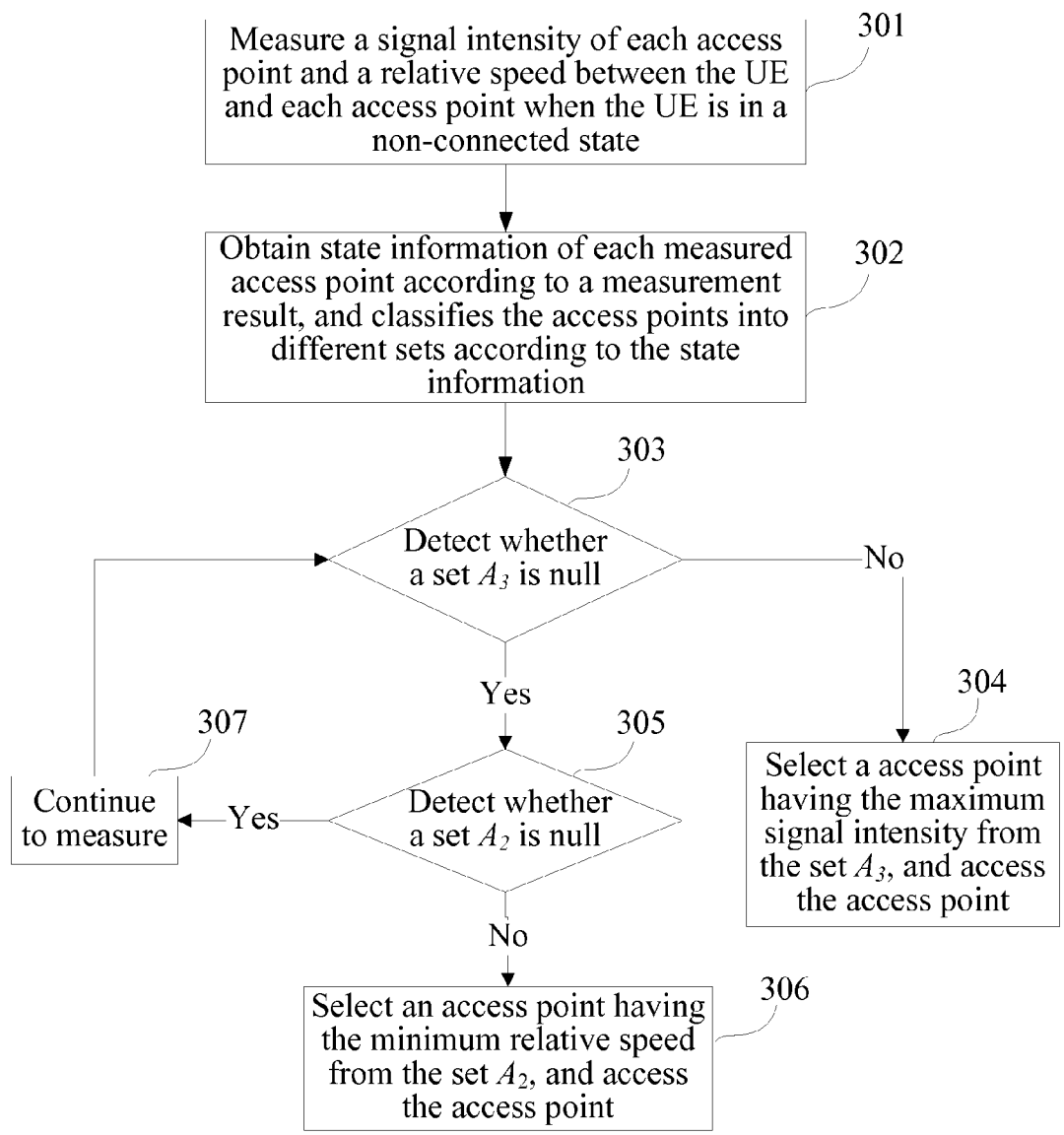
FIG. 3 is a flowchart of an access method of a UE in a non-connected state according to an embodiment of the present invention.

FIG. 3 is a flowchart of an access method for a UE in a non-connected state, according to an embodiment of the present invention.

Step 301, when the UE is in the non-connected state, it measures a signal intensity of each access point and a relative speed between the UE and the access point.

Step 302, according to the measurement result, the UE obtains state information of each measured access point based on the following Table 1, and, according to the state information, classifies the access points into different sets based on the flowing Table 2.

A logic variable IE is used to indicate whether the signal intensity of each measured access point satisfies a UE access requirement, and IE=1 indicates that the signal intensity satisfies the UE access requirement, i.e. the UE can establish a communication connection with the access point, while IE=0 indicates that the signal intensity does not satisfy the UE access requirement.

A logic variable IV is used to indicate whether the relative speed $V_r$ between the UE and each measured access point satisfies a condition $V_r \leq V_0$, and IV=1 indicates that the relative speed satisfies the condition, while IV=0 indicates that the relative speed does not satisfy the condition.

TABLE 1

States of Measured Access Points

| State | IE | IV |
|---|---|---|
| $S_0$ | 0 | 0 |
| $S_1$ | 0 | 1 |
| $S_2$ | 1 | 0 |
| $S_3$ | 1 | 1 |

In order to facilitate the UE to select an appropriate access point, the measured access points are divided into different access priorities according to the states, and the access priority is represented by a variable P. It is assumed that the greater the value of P is, the higher the access priority is, that is, the UE preferentially selects the access point having a great value of P as the access point. P=0 indicates that the UE cannot establish a communication connection with the access point. The access priorities corresponding to the states are shown in Table 2.

TABLE 2

Sets of Access Points in Different States and Definitions of Different Access Priorities

|  | $S_0$ | $S_1$ | $S_2$ | $S_3$ |
|---|---|---|---|---|
| Access Priority P | 0 | 0 | 1 | 2 |
| Set |  |  | $A_2$ | $A_3$ |

It is assumed that $A_i$ represents a set of all the access points in a $S_i$ state, and according to the above definitions of the access priorities of the access points in the different states, in this embodiment, the sets of the access points selected and initially accessed by the UE are $A_2$ and $A_3$.

The access points in the different states are classified into the different sets.

Step 303, when the UE needs to establish a connection with a network, the UE detects whether the set $A_3$ is empty according to the definitions of the access priorities in Table 2, and if it is not empty, Step 304 is performed; otherwise, Step 305 is performed.

Step 304, the UE selects an access point having the maximum signal intensity from the set $A_3$, and establishes a communication connection with the access point.

Step 305, the UE detects whether the set $A_2$ is empty, and if it is not empty, Step 306 is performed; otherwise, Step 307 is performed.

Step 306, the UE selects an access point having the minimum relative speed from the set $A_2$, and establishes a communication connection with the access point.

In Step 307, the UE continues to measure, so as to find the access point that is appropriate for the UE to access.

A handover decision method for a UE in a connected state is described in the following.

When the UE detects a relative move between the UE and the serving access point, the UE selects another neighboring access point satisfying the access requirement and being relatively static ($V_r \leq V_0$) as a target handover access point as soon as possible, and is quickly handed over to the target access point with no need to wait for a signal intensity margin and a measurement time to satisfy the condition, as long as the target access point satisfies the UE access requirement. In other situations, when $V_r \leq V_0$, only when the signal intensity of the measured target handover access point and the signal intensity of the serving access point satisfy the condition that the measurement time $T \geq T_0$, in which $T_0$ is a delay, the UE is handed over by using the "delay and margin" method, so as to prevent a ping-pong handover. For example, only when $E_d > E_s$+Margin is satisfied, the handover process is started, in which $E_d$ is the signal intensity of the target handover access point, $E_s$ is the signal intensity of the serving access point, and "Margin" in the equation represents a handover margin.

Suppose that a logic variable $IV_s$ represents whether the relative speed $V_r$ between the UE and the serving access point satisfies a condition $V_r \leq V_0$, and $IV_s=1$ indicates that the relative speed satisfies the condition, while $IV_s=0$ indicates that the relative speed does not satisfy the condition.

Suppose that a logic variable $IV_d$ represents whether the relative speed $V_r$ between the UE and the neighboring measured access point satisfies the condition $V_r \leq V_0$, and $IV_d=1$ indicates that the relative speed satisfies the condition, while $IV_d=0$ indicates that the relative speed does not satisfy the condition.

Suppose that a logic variable $IE_m$ represents whether the signal intensity $E_d$ of the measured neighboring access point and the signal intensity $E_s$ of the serving access point satisfy the condition $E_d > E_s$+Margin, and if yes, $IE_m=1$; otherwise, $IE_m=0$.

Suppose that a logic variable $IE_d$ represents whether the signal intensity of the measured neighboring access point satisfies the UE access condition, and if yes, $IE_d=1$; otherwise, $IE_d=0$.

Suppose that a logic variable IT represents whether the signal intensity of the measured neighboring access point satisfies the UE access requirement for a time period T and T satisfies the condition $T \geq T_0$, and if yes, IT=1; otherwise, IT=0.

Therefore, a logic handover decision function $F_h(IV_s, IV_d, IE_d, IE_m, IT)$ may be configured to indicate whether the UE needs to be handed over, $F_h=1$ indicates that the terminal needs to be handed over from the serving access point to the measured access point, and $F_h=0$ indicates that the terminal does not need to be handed over. Table 3 gives a sample expression of the handover decision function $F_h$.

TABLE 3

Expression of Handover Decision Function $F_h$

| | $IE_d IE_m IT$ | | | | | | | |
|---|---|---|---|---|---|---|---|---|
| $IV_s IV_d$ | 000 | 001 | 011 | 010 | 110 | 111 | 101 | 100 |
| 00 | 0 | 0 | X | X | 0 | 1 | 0 | 0 |
| 01 | 0 | 0 | X | X | 1 | 1 | 1 | 1 |
| 11 | 0 | 0 | X | X | 0 | 1 | 0 | 0 |
| 10 | 0 | 0 | X | X | 0 | 1 | 0 | 0 |

According to Table 3, the expression of the logic function $F_h$ for deciding whether the handover is performed by the UE is as follows.

$$F_h = \overline{IV_s}IV_dIE_dIE_mIT + \overline{IV_s}IV_dIE_dIE_mIT + \overline{IV_s}IV_dIE_d\overline{IE_m}IT + \overline{IV_s}IV_dIE_d\overline{IE_m}IT + \overline{IV_s}\overline{IV_d}IE_dIE_mIT + IV_sIV_dIE_dIE_mIT + IV_s\overline{IV_d}IE_dIE_mIT \quad (1)$$

where a variable name having a line above it means the value of the variable is 0, otherwise it is 1.

The expression is simplified based on a Karnaugh map of the logic function $F_h$, and an expression of the logic function of performing the handover decision by the UE may be obtained.

$$F_h = IE_dIE_mIT + \overline{IV_s}IV_dIE_d \quad (2)$$

If the UE is handed over, the UE selects an access point having the maximum signal intensity from one or more access points that satisfy the access requirement and establishes a communication connection with the access point.

It is impossible that a value of $IE_dIE_mIT$ is 011 and 010, that is, the state, in which the signal intensity $E_d$ of the measured access point does not satisfy the UE access requirement but satisfies the condition $E_d > E_s$+Margin, does not exist. The impossible state is represented by X, as shown in Table 3.

When the signal intensity of the measured access point does not satisfy the UE access requirement at all, the measured access point may not be selected as the target handover access point of the handover, that is, $IE_d=0$, and the terminal is not handed over to the measured access point, such that $F_h=0$, as shown in the first column and the second column in Table 3.

A quick handover process is described in the following.

When the relative speed $V_r$ between the UE and the serving access point does not satisfy the condition $V_r \leq V_0$, that is, $IV_s = 0$, if the signal intensity of the measured access point satisfies the access requirement, and the relative speed $V_r'$ between the UE and the measured access point satisfies the condition $V_r' \leq V_0$, that is, $IV_d = 1$ and $IE_d = 1$, the UE is handed over to the measured neighboring access point, as shown in the fifth column to the eighth column of the second row in Table 3. If a plurality of measured access points satisfies the condition, the UE selects the most appropriate target handover access point according to the priorities defined in the following Table 4.

TABLE 4

Access Priorities Corresponding to States of Access Points when $IV_s IV_d$ is 01

| | $IE_d E_m IT$ | | | |
|---|---|---|---|---|
| | 110 | 111 | 101 | 100 |
| Priority | 3 | 4 | 2 | 1 |

The priority having the maximum value represents the highest priority. Therefore, when the value of $IV_s IV_d$ is 01 and a plurality of measured access points satisfies the requirement of serving as the target access point to hand over, the UE firstly selects the measured access point having the value of $IE_d E_m IT$ being 111 as the target access point to hand over, and if the measured access point in a high priority state does not exist, the UE selects the access points having the value of $IE_d E_m IT$ being 110, 101, 100 as the target access point to hand over in sequence. When a plurality of measured access points having the same value of $IE_d E_m IT$ exists, the UE selects the access point having the maximum value of $E_d$ as the target access point to handover.

The process that the UE is handed over by using the "delay and margin" method is described in the following.

When the serving access point does not move relative to the UE, that is, the relative speed $V_r$ satisfies the condition $V_r \leq V_0$, the UE is handed over by using the "delay and margin" method. In this manner, only when the relative speed $V_r'$ between the measured access point and the UE satisfies the condition $V_r' \leq V_0$, and the signal intensity of the measured access point is higher than the signal intensity of the current serving access point and reaches the threshold represented by Margin for a time period longer than $T_0$, the UE considers to be handed over from the current serving access point to the measured access point, so as to better prevent a ping-pong handover. In this case, $IV_s = 1$, and only when the value of $IE_d E_m IT$ is 111, the UE is handed over, as shown in the third row and the fourth row of the sixth column in Table 3. In this scenario, if a plurality of measured access points satisfies the condition of serving as the target handover access point, the UE selects the most appropriate target handover access point according to the access priorities defined in Table 5, in which the priority having the greater value represents the higher priority. If pluralities of measured neighboring access points satisfy the condition are the same, the UE selects the access point having the maximum value of $E_d$ as the target access point.

TABLE 5

Access Priorities Corresponding to States of Access Points when $IV_s IE_d E_m IT$ is 1111

| | $IV_d$ | |
|---|---|---|
| | 0 | 1 |
| Priority | 1 | 2 |

When neither of the relative speed between the serving access point and the UE and the relative speed between the target access point and the UE satisfy the condition $V_r \leq V_0$, the two access points are relatively not stable, and the UE considers to be handed over by using the "delay and margin" method, which is the situation shown in Table 3 with the value of $IV_s IV_d IE_d E_m IT$ being 00111. If a plurality of measured access points satisfies the condition, the UE selects the access point having the maximum value of $E_d$ as the target handover access point.

An embodiment of calculating the reference speed $V_0$ by the access point is described in the following.

The reference speed $V_0$ is determined with the consideration of a statistic average speed $\overline{V}$ of the UEs in a cell coverage, and the value of $V_0$ is set based on the average speed, for example, as shown in a formula in the following:

$$V_0 = \alpha \overline{V}, \text{ in which } \alpha_{min} < \alpha < \alpha_{max}.$$

When $\alpha > \alpha_{min}$, unnecessarily handover is prevented from occurring to the terminal as much as possible, and when $\alpha < \alpha_{max}$, it is mainly considered that the terminal can be handed over in time after the access point moves.

In a preferred embodiment, it can set that $\alpha_{min} = 1$ and $\alpha_{max} = 2$, that is $1 < \alpha < 2$.

In another embodiment, $\alpha$ may be fixedly set or dynamically adjusted, for example, when people are crowded and the users are dense at a station at noon, $\alpha$ may be adjusted smaller, and when the users are few in the early morning, $\alpha$ may be adjusted greater.

In another embodiment, a variation range of the walking speed of the users is limited, and usually a common walking speed is 4 km/h, a marching speed is 5 km/h, and a rapid marching speed is 6 km/h. These speeds are much lower than a train speed. For the peak traffic moment of the train, $V_0 = 6$ km/h may be directly set, and the access point may broadcast the $V_0$ to the UE, or the $V_0$ is set in the UE.

A method for measuring the relative speed between the UE and each access point by using a Doppler frequency shift method according to an embodiment of the present invention is described in the following.

Based on a currently mature Doppler frequency shift detection technique, a basic principle of the method is described in the following formula, that is, the Doppler frequency shift of the access point is direct proportional to the relative speed between the UE and the access point.

$$f_d = \frac{v_r}{c} f_0 \quad (3)$$

where $f_d$ is the Doppler frequency shift, $v_r$ is the relative speed between the UE and the access point, and $f_0$ is an emission frequency of the access point.

A light speed c and $f_0$ are already known to the UE, such that when the Doppler frequency shift is detected, the relative speed is calculated according to the following formula:

$$v_r = \frac{f_d}{f_0} c \quad (4)$$

The detection of the Doppler frequency shift belongs to a typical signal detection technology, and many detection methods can be used, which are related to specific signal characteristics, for example, signal modulation modes, signal working frequency bands, and broadcast environments. For the details of the detection, reference can be made to related documents.

Standard organizations represented by the 3rd Generation Partnership Project (3GPP) have already compiled the GPS speed measuring function into a standard as one of the capabilities of the UE. The GPS speed measuring function provided by the access point is similar to that of the terminal. The GPS-based speed measuring method is supported by plenty of mature technologies, for example, single-point speed measurement, differential speed measurement, and location differential smooth speed measurement may be applied, and the present invention is not limited thereto.

Figure 4:
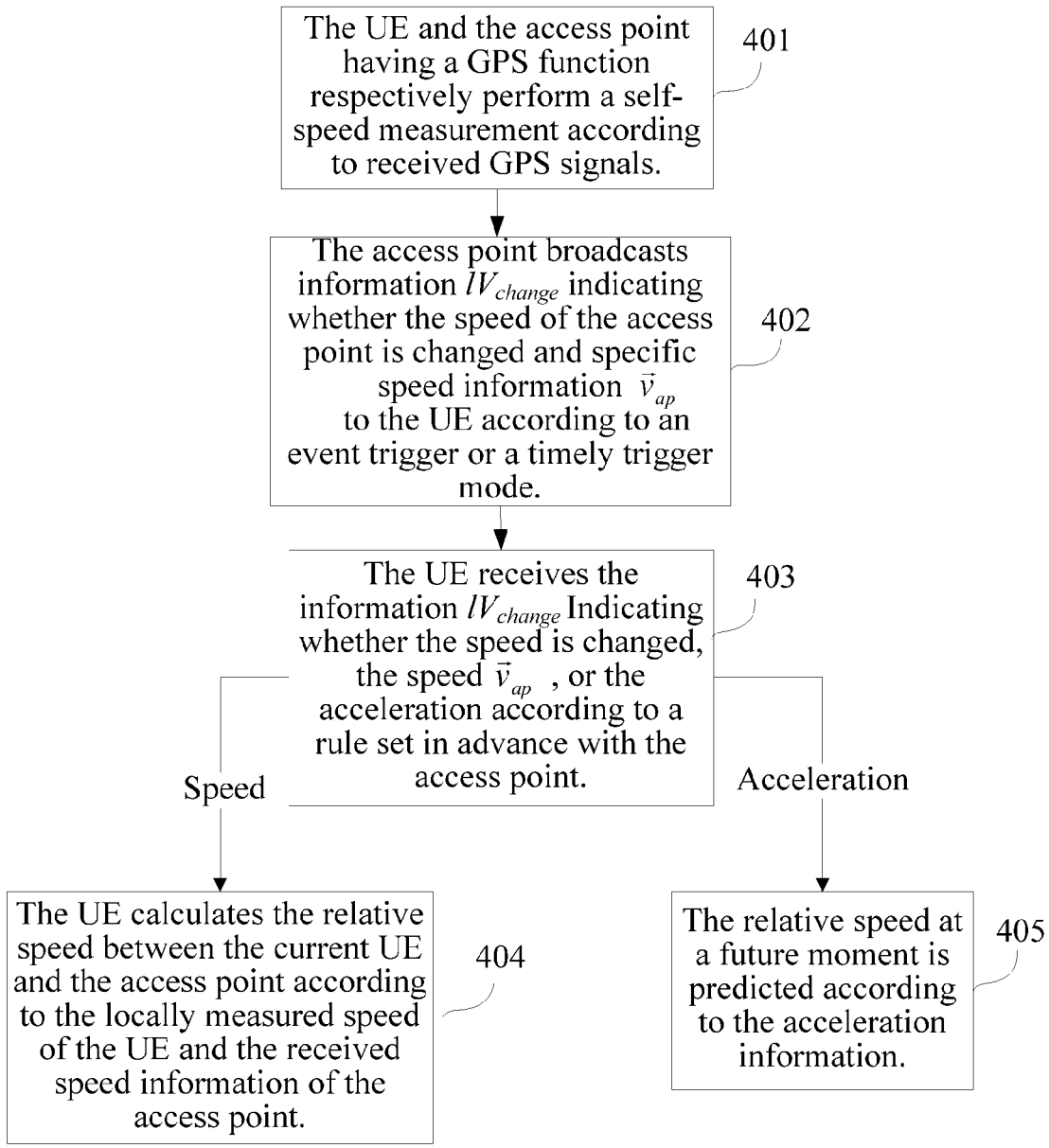
FIG. 4 is a flowchart of a method for calculating relative speeds by the UE using a global positioning system (GPS) according to an embodiment of the present invention.

FIG. 4 is a flowchart of a method for measuring relative speeds by the UE using a GPS according to an embodiment of the present invention.

Step 401, the UE and the access point having a GPS function respectively perform a self-speed measurement according to received GPS signals.

Step 402, the access point broadcasts to the UE information $IV_{change}$ indicating whether the speed of the access point is changed and specific speed information $\vec{v}_{ap}$ according to an event trigger mode or a time trigger mode. In addition, the access point may selectively broadcast to the UE acceleration information $\vec{\alpha}_{ap}$ measured by the access point itself.

Step 403, the UE receives the information $IV_{change}$ indicating whether the speed is changed, the speed $\vec{v}_{ap}$, or the acceleration $\vec{a}_{ap}$ according to a rule set in advance with the access point.

Step 404, the UE measures the relative speed $\vec{v} = \vec{v}_{ue} - \vec{v}_{ap}$ between the UE and the access point according to the locally measured speed $\vec{v}_{ue}$ of the UE and the received speed information $\vec{v}_{ap}$ of the access point.

Step 405, if the UE obtains the acceleration information $\vec{a}_{ap}$ of the access point, the UE may predict the relative speed $\vec{v}_r = \vec{v}_{ue} - (\vec{v}_{ap} + \vec{a}_{ap} \Delta t)$ at a future moment $\Delta t$ according to the acceleration information.

In an embodiment of the present invention, in Step 402, $IV_{change}=1$ means the speed is changed, while $IV_{change}=0$ means the speed is not changed, and only when $IV_{change}=1$, the access point broadcasts the speed and the acceleration information on a high-speed channel. The access point may also periodically broadcast the speed and the acceleration information on a low-speed channel regardless of the value of $IV_{change}$.

In an embodiment of the present invention, in Step 402, when the UE measures the access point for the first time, the UE receives the speed change information $IV_{change}$ indicating whether the speed of the access point is changed. If the information $IV_{change}$ indicates that the speed is changed, the terminal immediately receives the speed information $\vec{v}_{ap}$ and the acceleration information $\vec{a}_{ap}$ on the high-speed channel, and then saves the speed information $\vec{v}_{ap}$ and the acceleration information $\vec{a}_{ap}$; otherwise, the terminal receives the speed information $\vec{v}_{ap}$ and the acceleration information $\vec{a}_{ap}$ on the low-speed channel and then saves the speed information $\vec{v}_{ap}$ and the acceleration information $\vec{a}_{ap}$.

After the first time of receiving, the UE periodically receives the speed change information $IV_{change}$, and only when the information indicates that the speed is changed, the UE again receives new speed and new acceleration information on the high-speed channel.

Figure 5:
FIG. 5 is a block diagram of a UE according to an embodiment of the present invention.

FIG. 5 is a block diagram a UE according to an embodiment of the present invention. The UE includes a measuring unit 501 and an access unit 502.

The measuring unit 501 is configured to measure a relative speed $V_r$ between the UE and each of a plurality of access points.

The access unit 502 is configured to select an access point among the plurality of access points to establish a communication connection between the UE and the access point if the relative speed $V_r$ between the UE and the access point is smaller than or equal to a threshold speed $V_0$.

Through the above embodiment, the UE can select the access point having an appropriate relative speed to establish a communication connection, so as to reduce access failures in the scenario of a mobile access point.

Figure 6:
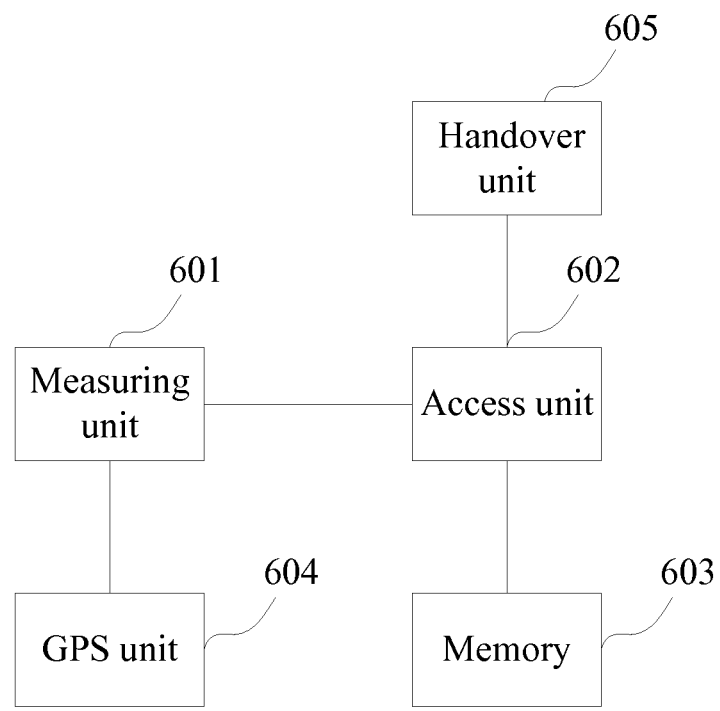
FIG. 6 is a block diagram of a UE according to another embodiment of the present invention.

FIG. 6 is a block diagram of a UE according to another embodiment of the present invention.

In this embodiment, the UE includes a measuring unit 601 and an access unit 602.

The measuring unit 601 is configured to measure a relative speed $V_r$ between the UE and each of a plurality of access points.

The access unit 602 is configured to select an access point among the plurality of access points to establish a communication connection between the UE and the access point if the relative speed $V_r$ between the UE and the access point is smaller than or equal to a threshold speed $V_0$.

The UE may further include a memory 603, configured to store the $V_0$. The $V_0$ may be preset or be received from broadcast information.

In an embodiment of the present invention, the measuring unit 601 may be further configured to measure Doppler frequency shifts of signals sent by each of the plurality of access points, and obtains the $V_r$.

In an embodiment of the present invention, the UE may further include a GPS unit 604, configured to collect speed information of the UE and forward the speed information to the measuring unit 601, and the measuring unit 601 may be further configured to measure the relative speed $V_r$ according to the speed information collected by the GPS unit of the UE and a GPS unit of the access point.

In an embodiment of the present invention, when the UE and the access points are in a non-connected state, if the relative speeds $V_r$ between the UE and a plurality of access points are all smaller than or equal to the threshold $V_0$, the access unit 602 may be further configured to select the access point having a maximum signal intensity from the plurality of access points to establish a communication connection.

In an embodiment of the present invention, when the UE and the access points are in a non-connected state, if the relative speeds $V_r$ between the UE and all the access points are all greater than the threshold $V_0$, the access unit 602 may be further configured to select the access point to establish a communication connection if relative speed $V_r$ between the UE and the access point is a minimum.

In an embodiment of the present invention, the UE may further include a handover unit 605. When the UE and a serving access point are in a connected state, the handover unit 605 is configured to perform a handover of the UE.

In an embodiment of the present invention, if the UE and a serving access point are in a connected state, and the $V_r$ between the UE and the serving access point is greater than the threshold $V_0$, the handover unit 605 may be configured to hand over the UE from the serving access point in the connected state to a neighboring access point if relative speed $V_r$ between the UE and the neighboring access point is smaller than or equal to the threshold $V_0$.

In an embodiment of the present invention, if the relative speed $V_r$ between the UE and each one of a plurality of neighboring access points is smaller than or equal to the threshold $V_0$, the access unit 602 may be configured to select the access point having a maximum signal intensity from the plurality of neighboring access points, and the handover unit 605 may be configured to hand over the UE to the access point; and if the relative speeds $V_r$ between the UE and all the access points are all greater than the threshold $V_0$, the handover unit 605 may hand over the UE by using a "delay and margin" method.

In an embodiment of the present invention, if the UE and a serving access point are in a connected state, and the $V_r$ between the UE and the serving access point is smaller than or equal to the threshold $V_0$, the handover unit 605 may handover the UE by using a "delay and margin" method.

In an application scenario of an embodiment of the present invention, in a railway station, a train pulls over and stops for ten minutes before leaving, and passengers are waiting on the platform or already boarded on the train. Some of the passengers may get on the train, then get off, and get on again. A mobile access point AP1 is installed on the train, and a fixed access point AP2 is installed on the platform.

Before the train starts moving, a UE receives broadcast messages sent by the ground access point AP2 and the mobile access point AP1, and knows that handover need to be performed based on the relative speed between the UE and each of the two access points and $V_0$=5 km/h, so that the UE starts measuring the AP1 and the AP2. As the two access points are not moved, the UE actually selects the AP1 or the AP2 to access by using a conventional decision method based on the signal intensity. The UE on the train may select the AP2, and the UE on the platform may select the AP1.

After the train starts moving, the UE on the platform that accesses the AP1 soon detects that the relative speed between the UE and the AP1 is $V_r$>5 km/h, and is immediately handed over from the AP1 to the AP2. On the other hand, the UE on the train that accesses the AP2 soon detects that the relative speed between the UE and the AP2 is $V_r$>5 km/h, and is immediately handed over from the AP2 to the AP1.

In another application scenario according to an embodiment of the present invention, in a railway station, passengers are waiting for a train T1 on the platform, and before the train T1 arrives, another train T2 passes by. A mobile access point 1 is installed on the train T2, and a fixed access point 2 is installed on the platform.

When the train T2 passes by the platform, a UE1 on the train T2 is about to connect with an access point, and the UE1 may detect that the signal intensities of the access point 1 on the train T2 and the access point 2 on the platform both satisfy the access requirement, but at the same time, the UE1 may detect that the relative speed between the UE1 and the access point 1 satisfies the condition $V_r$<5 km/h while the relative speed between the UE1 and the access point 2 does not satisfy the condition, so that the UE1 selects the access point 1 to access.

In addition, a UE2 on the platform is about to connect with an access point, the UE2 may detect that the signal intensities of the access point 1 on the train T2 and the access point 2 on the platform both satisfy the access requirement, but at the same time, the UE2 may detect that the relative speed between the UE2 and the access point 2 satisfies the condition $V_r$<5 km/h while the relative speed between the UE2 and the access point 1 does not satisfy the condition, so that the UE2 selects the access point 2 to connect.

Through the embodiments of the above scenarios, it may solve the problem that after a large number of UEs establish communication connections with the access points, when the mobile access point starts to move from a static state, the UEs cannot be handed over from the mobile access point in time, and the UEs on the train that access the ground access point cannot be handed over to the mobile access point in time. In addition, the ground UEs are prevented from accessing the mobile access point on a transportation means passing by.

The present invention has the following beneficial effects. The UE establishes a communication connection with the access point according to the relative speeds between the UE and the access points. When a MRS starts moving, the ground terminal is handed over from the MRS in time, and the on-vehicle terminal is handed over to the MRS in time. It is ensured that the ground terminal does not access the moving MRS as much as possible, and during the movement, the on-vehicle terminal does not access the ground fixed base station or other neighboring MRSs as much as possible. In the region with dense users, for example, the platform, when all the access points are in a static state, it is ensured that the ping-pong handover of the user terminal is avoided.

Persons of ordinary skill in the art should understand that all or part of the steps of the method according to the embodiments of the present invention may be implemented by a hardware device that executes instructions written in the form of a computer program. The program may be stored in a computer readable storage medium. When the program runs, the steps of the method according to the embodiments of the present invention are performed. The storage medium may be any medium that is capable of storing program codes, such as a magnetic disk, a Compact Disk Read-Only Memory (CD-ROM), a Read-Only Memory (ROM) or a Random Access Memory (RAM).

Detailed above are the objectives, technical solution and merits of the present invention. Although the invention has been described through several exemplary embodiments, the invention is not limited to such embodiments. Any modification, equivalent replacement, or improvement made without departing from the spirit and principle of the present invention should fall within the scope of the present invention.

What is claimed is:

1. A method for a user equipment (UE) to access a wireless network, wherein the wireless network comprises a plurality of access points and the UE is in communication with a serving access point, the method comprising:

measuring a Doppler frequency shift of a signal sent by each of the plurality of access points to obtain a relative speed between the UE and the each of the plurality of access points according to the Doppler frequency shift;

measuring a signal intensity of each of the plurality of access points;

when the relative speed between the UE and the serving access point is greater than a threshold speed, determining whether there is at least one non-serving access point the relative speed between which and the UE is smaller than or equal to the threshold speed; and if there are one or more non-serving access points the relative speed between which and the UE is smaller than or equal to the threshold speed, and one non-serving access point having a maximum signal intensity is selected among the one or more non-serving access points for the serving access point to hand over the UE to, establishing a communication connection between the UE and the selected non-serving access point.

2. The method according to claim 1, wherein before measuring the relative speed between the UE and each of the plurality of the access points, the method further comprises:
receiving, by the UE, broadcast information of each of the plurality of access points, and acquiring the threshold speed from the broadcast information.

3. The method according to claim 1, wherein before the measuring the relative speed between the UE and each of the plurality of the access points, the method further comprises:
storing a preset value as the threshold speed in the UE.

4. The method according to claim 2, wherein the plurality of access points comprise mobile access points, fixed access points, or both.

5. The method according to claim 1, wherein the measuring the relative speed between the UE and each of the plurality of access points comprises:
measuring, by the UE, the relative speed according to speed information collected by a global positioning system (GPS) of the UE and speed information collected by the GPS of each of the plurality of access points.

6. The method according to claim 1, wherein when the relative speed between the UE and the serving access point is greater than the threshold speed, and if the relative speed between the UE and each of the plurality of non-serving access points is also greater than the threshold speed, the UE is handed over from the serving access point to the selected non-serving access point by using a "delay and margin" method.

7. The method according to claim 6, wherein the "delay and margin" method is such that:
the UE is handed over to the selected non-serving access point if the signal intensity of the selected non-serving access point is higher than the signal intensity of the serving access point, and the signal intensity of the serving access point has reached an intensity threshold for a time period longer than a time threshold.

8. The method according to claim 1, wherein if the relative speed between the UE and the serving access point is smaller than or equal to the threshold speed, and the signal intensity of the serving access point is lower than a intensity threshold, the UE is handed over from the serving access point to the selected non-serving access point by using a "delay and margin" method.

9. The method according to claim 8, wherein the "delay and margin" method is such that:
the UE is handed over to the selected non-serving access point if the relative speed between the selected non-serving access point and the UE is smaller than or equal to the threshold speed, and the signal intensity of the selected non-serving access point is higher than the signal intensity of the serving access point and has reached the intensity threshold for a time period longer than a time threshold.

10. A user equipment (UE), wherein the UE is in communication with a serving access point of a wireless network, and the wireless network comprises a plurality of access points, the UE comprising:
a measuring unit, configured to measure a Doppler frequency shift of a signal sent by each of the plurality of access points to obtain a relative speed between the UE and the each of the plurality of access points according to the Doppler frequency shift and configured to measure a signal intensity of each of the plurality of access points; and
an access unit, configured to, when the relative speed between the UE and the serving access point is greater than a threshold speed, determine whether there is at least one non-serving access point the relative speed between which and the UE is smaller than or equal to the threshold speed; and if there are one or more non-serving access points the relative speed between which and the UE is smaller than or equal to the threshold speed, and one non-serving access point having a maximum signal intensity is selected among the one or more non-serving access points for the serving access point to hand over the UE to, establish a communication connection between the UE and the selected non-serving access point.

11. The UE according to claim 10, further comprising:
a memory, configured to store a preset value as the threshold speed.

12. The UE according to claim 10, further comprising:
a global positioning system (GPS) unit, configured to collect speed information of the UE, wherein the measuring unit is further configured to measure the relative speed between the UE and each of the plurality of access points according to the speed information collected by the GPS unit and speed information of each of the plurality of access points.

13. A computer program product comprising a computer readable non-transitory storage medium storing program code thereon for use by a user equipment (UE), wherein the UE is in communication with a serving access point of a wireless network, and the wireless network comprises a plurality of access points, the program code comprising:
instructions for measuring a Doppler frequency shift of a signal sent by each of the plurality of access points to obtain a relative speed between the UE and the each of the plurality of access points according to the Doppler frequency shift;
instructions for measuring a signal intensity of each of the plurality of access points;
instructions for determining, when the relative speed between the UE and the serving access point is greater than a threshold speed, whether there is at least one non-serving access point the relative speed between which and the UE is smaller than or equal to the threshold speed; and
instructions for establishing a communication connection between the UE and a selected non-serving access point, if there are one or more non-serving access points the relative speed between which and the UE is smaller than or equal to the threshold speed and one non-serving access point having a maximum signal intensity is selected among the one or more non-serving access points for the serving access point to hand over the UE to.

14. The computer program product according to claim 13, wherein the instructions for measuring the relative speed between the UE and each of the plurality of access points of the wireless network comprising:
    instructions for measuring the relative speed according to speed information collected by a global positioning system (GPS) of the UE and speed information collected by the GPS of each of the plurality of access points.

\* \* \* \* \*